Jan. 20, 1942.　　　E. B. MIDDLETON ET AL　　　2,270,378
PHOTOGRAPHIC SENSITIZING DYE
Filed Nov. 11, 1937

Edmund B. Middleton
Andrew B. Jennings
INVENTORS

BY

ATTORNEY

UNITED STATES PATENT OFFICE 2,270,378

PHOTOGRAPHIC SENSITIZING DYE

Edmund B. Middleton, Metuchen, and Andrew B. Jennings, New Brunswick, N. J., assignors to Du Pont Film Manufacturing Corporation, Wilmington, Del., a corporation of Delaware Application November 11, 1937, Serial No. 174,114

12 Claims. (Cl. 95—7)

This invention relates to new unsymmetrical carbocyanine dyes, and to photographic materials such as emulsions or films or plates coated with emulsions containing such dyes.

This invention has for an object the preparation of new unsymmetrical carbocyanine dyes; a further object is the preparation of unsymmetrical cyanine dyes which render photographic emulsions sensitive to light rays in the far red region of the spectrum. A still further object is the prepartion of photographic emulsions which are light sensitive in the normal range and have an extra sensitivity in the range of 620 to 740 millimicrons of the spectrum. Still other objects include the preparation of plates and films coated with such emulsions. Other objects will appear hereinafter.

The above and other objects are achieved by the following invention which comprises the preparation of unsymmetrical dyes hereinafter described and their incorporation into light sensitive photographic materials.

The dyes of the present invention have the following general formula:

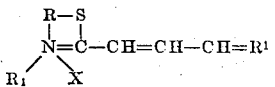

wherein R is a naphthylene radical and R' is a gamma quinolinyl radical which may be substituted in the benzene nucleus by an open or closed chain hydrocarbon radical and contains an alkyl group attached to the N atom, $R_1$ represents an aliphatic hydrocarbon radical, e. g. methyl, ethyl, propyl and higher homologues thereof; and X represents a negative acid radical such as halide, e. g. chloride, bromide, iodide, paratoluene sulfonate, ethyl sulfate, chlorate, etc.

Thus the heterocyclic nitrogen radical attached on one side of the trimethinyl chain may be an alpha or beta naphthothiazole quaternary salt, which may contain a substituent selected from the group consisting or alkyl e. g. methyl, ethyl, propyl and higher homologues, halogen, e. g. chlorine, bromine, iodine and fluorine, substituted amino (diethylamino, dimethylamino etc.) aryl (e. g. phenyl, tolyl) and other radicals capable of varying the sensitivity range of the dye in a gelatine silver halide emulsion.

In preparing our new dyes, we employ as starting materials compounds having the general formula (2)

in which R represents a closed ring aromatic radical which may or may not contain monovalent substituents in place of hydrogen, or a radical of the benzene series containing monovalent substituents. The monovalent substituents may be, for example, alkyl (e. g. methyl, ethyl, propyl etc.) aryl (e. g. phenyl) and other monovalent substituents capable of varying the sensitivity of the resultant dye.

These compounds (Formula 2) may be prepared by condensing one mol of methyl vinyl ketone with one mol of a primary aromatic amine having a free ortho position, and containing in one or more of the other positions a monovalent substituent or a condensed ring which may or may not be substituted. The conditions of condensation are such as to eliminate both hydrogen and water and are similar to those used in the Skraup synthesis. A specific example of the procedure employed will appear below.

One mol of the compound of Formula 2 is heated with one mol of organic salt-forming compounds, e. g. an alkyl salt or an aliphatic ester to form a quaternary salt having the formula (3)

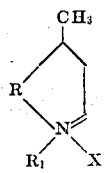

wherein $R_1$ and X have the same significance as $R_1$ and X have in the dye formula in the fourth paragraph of this specification.

The dyes are prepared by reacting the quaternary salts of Formula 3 with the intermediate formed by reacting an alpha or beta naphthothiazole quaternary salt with a diaryl formamidine, preferably diphenyl formamidine, in the presence of an acid binding agent or solvent, e. g. pyridine, piperidine, fused sodium acetate, tri-n-propylamine, triethanolamine, sodiumethylate, caustic soda, etc. Additional solvents may be used, e. g. acetic anhydride with sodium acetate, alcohol with alkali metal bases, etc.

The spectrograms of the accompanying drawing show the sensitivity of emulsions containing our dyes.

In the drawing

Figure 1:
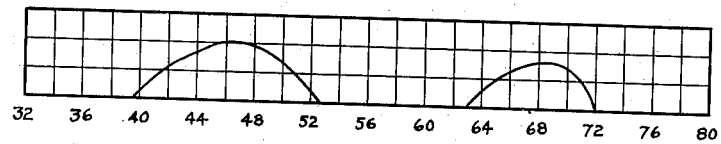
Fig. 1 illustrates the sensitivity of the dye of Example I.

The invention will be further understood but is not to be limited by the following examples

Example I

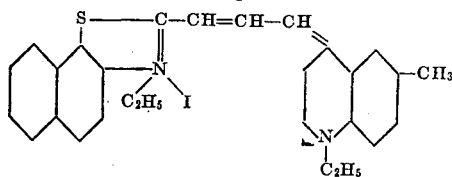

This dye can be prepared by the following procedure: A mixture of 17.8 parts of 2-methyl-alpha naphthothiazole ethiodide and 10 parts of diphenyl formanidine was heated in an oil bath at 100-150° C. for 10 minutes. First a dark colored melt was obtained which later solidified. After cooling, the solid was taken up in absolute alcohol and precipitated with a large amount of ether. Dark blue-black needles were obtained, after crystallizing from alcohol. The dye was prepared by refluxing for 10 minutes in a small amount of acetic anhydride, 1.18 parts of this intermediate product, 0.8 part of 4-6 dimethyl quinoline ethiodide, and 1 part of fused sodium acetate. The solution turned blue-green, and after cooling, the product was filtered, washed with ether and recrystallized from alcohol.

Example II

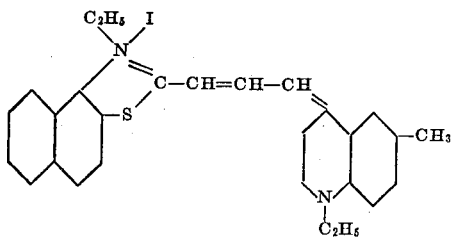

This dye can be prepared in a manner exactly similar to that of Example I by substituting 17.8 parts of 2-methyl-beta naphthathiazole ethiodide for the alpha reactant of the preceding example. After recrystallizing from alcohol, the dye was obtained as dull bluish granular crystals.

Example III

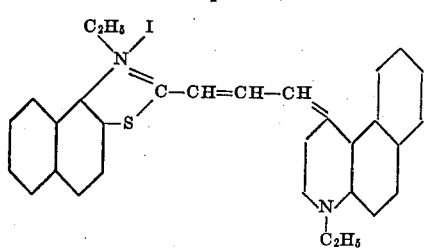

This dye can be obtained by condensing a beta benzolepidine quaternary salt with the intermediate compound formed from diphenyl formamidine and methyl-beta naphthothiazole ethiodide.

Preparation of benzolepidine

Beta benzolepidine can be prepared as follows: A mixture of 71 parts of β-naphthylamine and 89 parts of concentrated HCl was warmed on the steam bath until the hydrochloride formed. Then 1.6 parts of ferrous chloride and 35 parts of methyl vinyl ketone dissolved in 13 parts nitrobenzene were added. Heating on the steam bath was continued for three hours after which the solution was made alkaline with NaOH solution and extracted with ether. The ether solution was dried over anhydrous potassium carbonate. On evaporating the ether, the residue was subjected to vacuum distillation. The material boiling at 205-215° at 16 mm. was collected. On standing several days, it crystallized. On cooling an absolute alcoholic solution of the material, in an ice-salt mixture, white crystals formed. M. P.=97-98°.

Preparation of the dye

One and one-half parts of beta benzolepidine and 1.7 parts of ethyl para-toluene sulfonate were heated for two hours at 140° C., in an oil bath and solid mass formed. This was dissolved in a small amount of pyridine and added to a solution containing about 3.5 grams of the intermediate formed from diphenyl formamidine and 2-methyl beta-naphthothiazole ethiodide were heated for one hour under reflux. A bluish green dye formed, which was precipitated from the pyridine solution by adding ether. The precipitate was recrystallized from alcohol.

Example IV

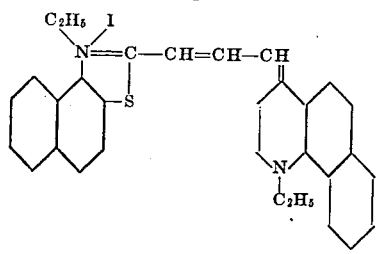

This dye can be prepared as follows: One and one-half parts of alphabenzolepidine (which may be prepared in a manner similar to the above described method of preparing betabenzolepidine by substituting alpha naphthylamine as a reactant) were heated with 1.7 parts of ethyl paratoluene sulfonate for four hours at 140° C. The melt was dissolved in pyridine and the pyridine solution was reacted with the ethiodide intermediate prepared from methyl betanaphthothiazole and diphenyl formamidine in a manner similar to that of Example III. A blue-green dye formed which was precipitated and recrystallized in the manner of the preceding example.

Example V

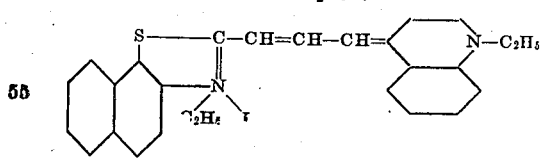

This dye may be prepared as follows: A mixture of 1.2 grams of the intermediate product from 2-methyl-alpha-naphthiazole ethiodide and diphenyl formamidine with .8 gram of lepidine ethiodide is heated to reflux in 25 cc. of acetic anhydride. One gram of fused sodium acetate is added and the refluxing continued 15 minutes. After cooling, the crude dye is filtered and recrystallized twice from alcohol to remove traces of a less soluble contaminating dye. A greenish-black crystalline powder is obtained in a yield of .2 gram. When incorporated in silver bromide emulsion, the dye imparts a band of extra sensitivity from 600-720 mμ with a maximum at about 690 mμ.

The dyes prepared according to the preceding examples were incorporated in gelatin-silverhalide emulsions in the manner known to those skilled in the art of photography. Thus the dye of Example I was dissolved in a suitable solvent such as methyl alcohol, acetone or pyridine to form a stock solution. An amount of solution containing about 10 to 15 milligrams of the dye was incorporated in about one liter of a flowable silver bromide emulsion containing about 97% silver bromide and 3% silver iodide, and the latter was coated upon a film base. The dye conferred upon the emulsion a band of extra sensitivity extending from about 620 to 720 m$\mu$ with a maximum at 690 m$\mu$. A spectogram of this dye forms the curve illustrated in Fig. 1 of the drawing. The dyes are also useful in gelatine silver chloride emulsions. These proportions are likewise merely illustrative and not limitative and other methods of incorporating the dye in a plate or film emulsion may be used.

Figure 2:
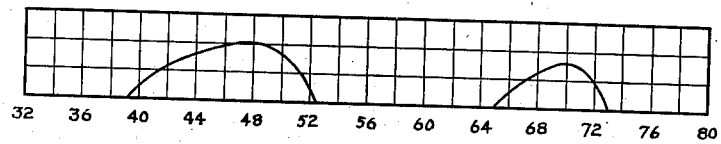
Fig. 2 illustrates the sensitivity of the dye of Example II.

The dye of Example II when incorporated in a silver bromide emulsion conferred upon the same a band of extra sensitivity extending from 640 to 730 m$\mu$ with a maximum at 700 m$\mu$. The sensitivity curve is illustrated in Fig. 2 of the drawing.

Figure 3:
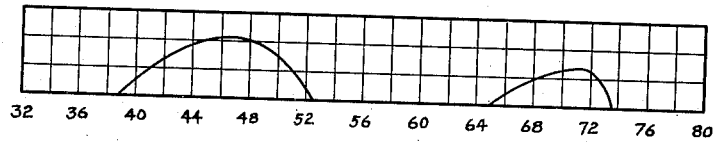
Fig. 3 illustrates the sensitivity of the dye of Example III.

The dye of Example III when incorporated in a silver bromide emulsion conferred upon the same a band of extra sensitivity extending from 630 to 750 m$\mu$ with a maximum at 710 m$\mu$. The sensitivity curve is illustrated in Fig. 3 of the drawing.

Figure 4:
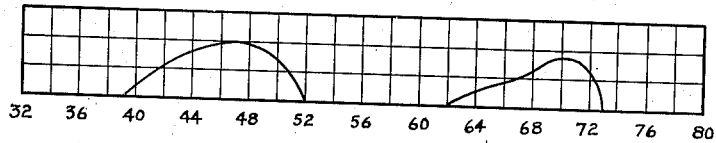
Fig. 4 illustrates the sensitivity of the dye of Example IV.

The dye of Example IV when incorporated in a silver bromide emulsion conferred upon the same a band of extra sensitivity extending from 620 to 740 m$\mu$ with a maximum at 710 m$\mu$. The sensitivity curve is illustrated in Fig. 4 of the drawing.

The dyes of this invention are particularly useful in photographic emulsions though they also have some utility in dyeing fibrous materials.

Certain of the dyes of this invention are especially valuable as far red sensitizers and have superior properties over known dyes since they do not extend too far into the infrared. Thus emulsions containing the dyes have the advantages that they may be used for simulating night effects. When exposed through a red filter such as a deep red A or F, the sky will look dark on the positive, making the scene appear to be taken at night.

The dyes of this invention are superior to far red sensitizers in other respects. For instance, the speeds are better, the fog values are low and the film ages well.

As many apparently widely different embodiments of the invention may be made without departing from the spirit and scope thereof it is to be understood that we do not limit ourselves to the specific embodiments thereof except as described in the following claims.

We claim:

1. A gelatino-silver-halide emulsion containing a photographic sensitizing dye of the general formula

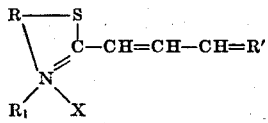

wherein R is a naphthalene radical, R' is a $\gamma$-quinolinyl radical which may be substituted in the carbocyclic nucleus by an open or closed chain hydrocarbon radical, $R_1$ is a hydrocarbon radical, and X is a negative acid radical.

2. A gelatino-silver-halide emulsion containing a photographic sensitizing dye of the general formula

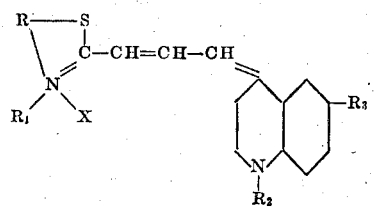

wherein R is a naphthylene radical, $R_1$ is a hydrocarbon radical, $R_2$ is a hydrocarbon radical, $R_3$ is an open chain hydrocarbon radical, and X is a negative acid radical.

3. A gelatino-silver-halide emulsion containing a photographic sensitizing dye of the general formula

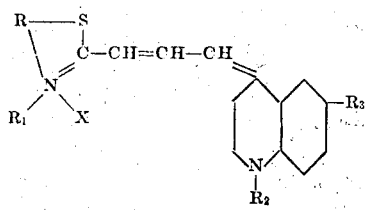

wherein R is a naphthylene radical, $R_1$ is a hydrocarbon radical, $R_2$ is a hydrocarbon radical, $R_3$ is a lower alkyl, and X is a negative acid radical.

4. A gelatino-silver-halide emulsion having sensitivity in the blue, red and deep red regions and free from substantial sensitivity in the green regions of the spectrum containing a photographic sensitizing dye of the general formula:

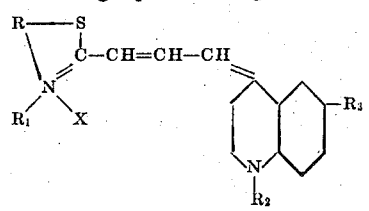

wherein R is an ortho naphthylene radical which forms a 5-membered ring with —S—C=N—, and an alpha carbon atom of said radical is attached to a non-carbon atom of the —S—C=N— radical; $R_1$ is a hydrocarbon radical, $R_2$ is a hydrocarbon radical, $R_3$ is a lower alkyl radical, and X is a negative acid radical.

5. As an article of manufacture, a photographic element comprising a transparent support coated with a photographic-silver-halide emulsion of the type defined in claim 1.

6. A gelatino silver halide emulsion having sensitivity in the blue, red and deep red regions and free from substantial sensitivity in the green regions of the spectrum, containing a photographic sensitizing dye of the formula:

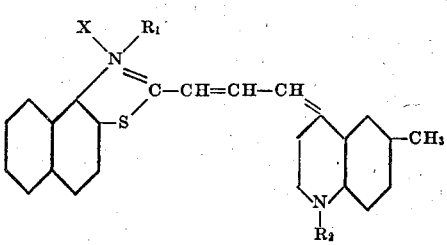

wherein $R_1$ and $R_2$ are lower alkyl radicals and X is a negative acid radical.

7. A gelatino silver halide emulsion having sensitivity in the blue, red and deep red regions and free from substantial sensitivity in the green regions of the spectrum, containing a photographic sensitizing dye of the formula:

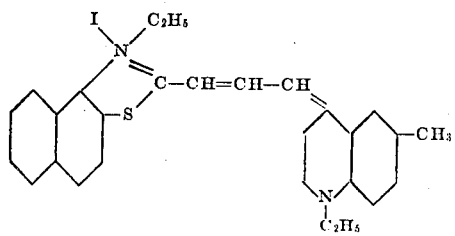

8. A gelatino silver halide emulsion having sensitivity in the blue, red and deep red regions and free from substantial sensitivity in the green regions of the spectrum, containing a photographic sensitizing dye of the formula:

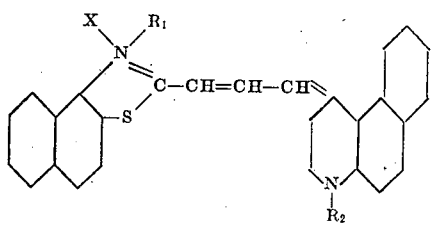

wherein $R_1$ and $R_2$ are lower alkyl radicals and X is a negtive radical of an acid.

9. A gelatino silver halide emulsion having sensitivity in the blue, red and deep red regions and free from substantial sensitivity in the green regions of the spectrum, containing a photographic sensitizing dye of the formula:

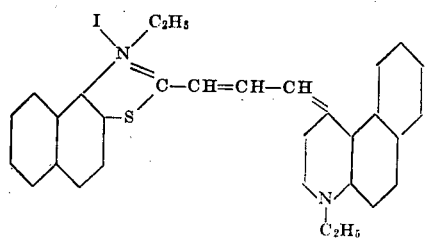

10. A gelatino silver halide emulsion having sensitivity in the blue, red and deep red regions and free from substantial sensitivity in the green regions of the spectrum, containing a photographic sensitizing dye of the formula:

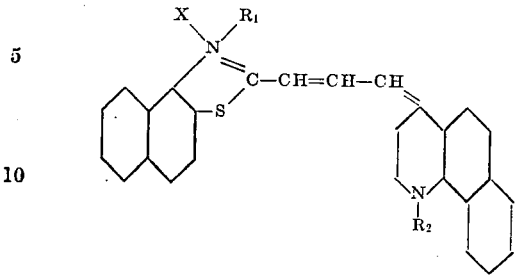

wherein $R_1$ and $R_2$ are lower alkyl radicals and X is a negative acid radical.

11. A gelatino silver halide emulsion having sensitivity in the blue, red and deep red regions and free from substantial sensitivity in the green regions of the spectrum, containing a photographic sensitizing dye of the formula:

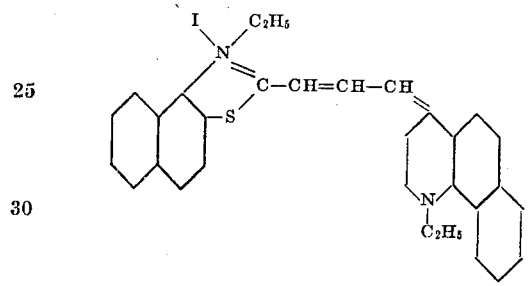

12. A gelatino-silver-halide emulsion having sensitivity in the blue, red and deep red regions and free from substantial sensitivity in the green regions of the spectrum containing a photographic sensitizing dye of the general formula:

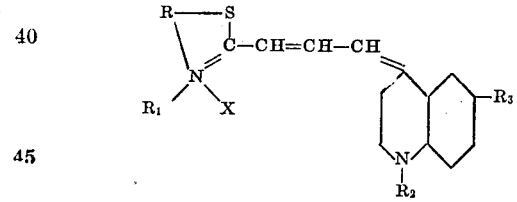

wherein R is an ortho naphthylene radical which forms a 5-membered ring with —S—C=N—, and an alpha carbon atom of said radical is attached to a non-carbon atom of the —S—C=N— radical; $R_1$ is a hydrocarbon radical, $R_2$ is a hydrocarbon radical, $R_3$ is a lower alkyl radical, and X is a negative acid radical.

EDMUND B. MIDDLETON.
ANDREW B. JENNINGS.